US006430276B1

(12) United States Patent
Bouvier et al.

(10) Patent No.: US 6,430,276 B1
(45) Date of Patent: Aug. 6, 2002

(54) TELECOMMUNICATIONS SYSTEM AND METHOD PROVIDING GENERIC NETWORK ACCESS SERVICE

(75) Inventors: Jean-René Bouvier, Saint-Nazaire-lés-Eymes; John O'Connell, Grenoble, both of (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/420,872

(22) Filed: Oct. 19, 1999

(30) Foreign Application Priority Data

Nov. 18, 1998 (EP) .............................. 98402897

(51) Int. Cl.[7] ........................ H04M 15/00; H04M 3/42; H04M 7/00; H04J 3/02
(52) U.S. Cl. ........................... 379/121.01; 379/201.02; 379/221.02; 379/221.08; 370/355; 370/401; 370/402; 370/422
(58) Field of Search ................... 379/90.01, 91.01, 379/92.04, 93.01, 93.02, 93.03, 93.05, 93.17, 93.31, 112, 114, 115, 121, 127, 207, 219, 220, 230, 201.02, 221.02; 370/351, 355, 352, 401, 402, 422

(56) References Cited

U.S. PATENT DOCUMENTS

| | | | |
|---|---|---|---|
| 4,659,877 A | 4/1987 | Dorsey et al. ............... | 379/88 |
| 5,265,033 A | 11/1993 | Vajk et al. .................. | 364/514 |
| 5,423,003 A | 6/1995 | Berteau ...................... | 395/200 |

(List continued on next page.)

FOREIGN PATENT DOCUMENTS

| | | | | |
|---|---|---|---|---|
| EP | 0 654 930 A1 | 5/1993 | ............ | H04M/3/42 |
| EP | 0 740 445 A2 | 10/1996 | ........... | H04L/29/06 |
| WO | WO 93/25035 | 12/1993 | ............ | H04M/7/00 |

(List continued on next page.)

OTHER PUBLICATIONS

AT&T, et al., "AT&T, Spanlink to Provide Secure Internet Links," Press Release (Dec. 4, 1995).
Atkins, et al., "Integrated Web and Telephone Service Creation," *Bell Labs Technical Journal*, Winter, pp. 19–35 (1997).
Berners–Lee, Tim, "Hypertext Transfer Protocol—HTTP/1.0," HTTP Working Group Internet Draft (Oct. 14, 1995).
Bonetti, et al., "Distribution of RFC 1327 Mapping Rules Via the Internet DNS: The INFNet Distributed Gateway System," *Computer Networks and ISDN Systems*, vol. 27, No. 3, pp. 461–469 (1994).
Chang, Wan–Teh, et al., "Rapid Deployment of CPE–based Telecommunications Services," *IEEE*, pp. 876–880 (1994).
Comer, et al., "Uniform Access to Internet Directory Services," *Computer Communications Review*, vol. 20, No. 4, pp. 50–59 (1990).
Eckardt, T., et al., "On the Personal Communications Impacts on Multimedia Teleservices," Multimedia: Advanced Teleservices and High–Speed Communication Architectures, International Workshop, (Apr. 26, 1994).
Esaki, Shuji, et al., "Service Logic Execution of IN in Multi–Vendor Environment," *NTT*, pp. 441–450 (May 1992).

(List continued on next page.)

*Primary Examiner*—Binh Tieu

(57) ABSTRACT

A generic access service is provided in a telephone system to enable users to get dialup access to different network access services. User profile data showing which network access services a user subscribes to is held on a database accessible to the service control subsystem of the telephone system. Upon detection of a particular phone number assigned to the generic access service an authentication procedure is initiated in the service control subsystem to identify the user. Once identified, the service control subsystem uses the user profile data to determine what access services are available to that user. Thereafter, a particular access service is selected and the number of a corresponding network access server derived.

43 Claims, 3 Drawing Sheets

U.S. PATENT DOCUMENTS

| | | | | |
|---|---|---|---|---|
| 5,438,568 | A | | 8/1995 | Weisser, Jr. .................. 370/60 |
| 5,452,350 | A | | 9/1995 | Reynolds et al. ........... 379/220 |
| 5,546,452 | A | | 8/1996 | Andrews et al. ............ 379/219 |
| 5,602,991 | A | | 2/1997 | Berteau ................. 395/200.01 |
| 5,703,940 | A | | 12/1997 | Sattar et al. ................ 379/201 |
| 5,708,780 | A | | 1/1998 | Levergood et al. .... 395/200.12 |
| 5,745,556 | A | * | 4/1998 | Ronen ........................ 379/127 |
| 5,828,666 | A | * | 10/1998 | Focsaneanu et al. ........ 370/389 |
| 5,845,267 | A | * | 12/1998 | Ronen ........................ 705/40 |
| 5,956,391 | A | * | 9/1999 | Melen et al. ............... 379/114 |
| 5,991,292 | A | * | 11/1999 | Focsaneanu et al. ........ 370/352 |
| 6,131,095 | A | * | 10/2000 | Low et al. .................... 707/10 |
| 6,185,289 | B1 | * | 2/2001 | Hetz et al. .................. 379/220 |
| 6,195,422 | B1 | * | 2/2001 | Jones et al. ................. 379/144 |
| 6,246,758 | B1 | * | 6/2001 | Low et al. .................. 379/230 |

FOREIGN PATENT DOCUMENTS

| | | | |
|---|---|---|---|
| WO | WO 94/23523 | 10/1994 | ............ H04M/3/42 |
| WO | WO 96/09714 | 3/1996 | .......... H04M/11/00 |
| WO | WO 96/20553 | 7/1996 | ............ H04M/3/50 |
| WO | WO 96/38018 | 11/1996 | ........... H04Q/11/04 |
| WO | WO 96/38962 | 12/1996 | ........... H04L/29/06 |
| WO | WO 97/16007 | 5/1997 | ........... H04L/12/66 |
| WO | WO 97/20424 | 6/1997 | ............ H04M/3/42 |
| WO | WO 97/22211 | 6/1997 | ............ H04Q/3/00 |
| WO | WO 97/26749 | 7/1997 | ............ H04M/3/54 |
| WO | WO 97/31491 A2 | 8/1997 | ............ H04Q/3/00 |
| WO | WO 97/31491 A3 | 8/1997 | ............ H04Q/3/00 |
| WO | WO 97/32427 | 9/1997 | ............ H04M/2/00 |
| WO | WO 98/37688 A2 | 8/1998 | ............ H04M/3/42 |
| WO | WO 98/37688 A3 | 8/1998 | ............ H04M/3/42 |

OTHER PUBLICATIONS

Esaki, Shuji, et al., "Abstraction and Control of Transport Network Resources for Intelligent Networks," *Electronics and Communications in Japan*, Part 1, vol. 76, No. 1, pp. 34–44 (Jan. 1993).

Genesys Telecommunications Laboratory, "Advanced Intelligent Internet," Press Release (Dec. 13, 1995).

IBM, "Workstation Communications System," *IBM Technical Disclosure Bulletin*, vol. 37, No. 9, pp. 101–103 (1994).

Kabay, S., et al., "The Service Node—An Advanced IN Services Element," *BT Technology Journal* vol. 13, No. 2, pp. 64–72 (1995).

Low, Colin, et al., "WebIN—An Architecture for Fast Deployment of IN–based Personal Services," Proceedings of IN '96, Melbourne (Apr. 1996).

Low, Colin, "The Internet Telephony Red Herring," HP Laboratories Technical Report (May 15, 1996).

Mockapetris, P., "Domain Names—Concepts and Facilities," RFC 1034 (DNS) (Nov. 1987).

NetPhonic Communications, "Web–On–Call Voice Browser Redefines Access to the Web," Press Release (Mar. 4, 1996).

Sevcik, M., et al., "Customers in Driver's Seat: Private Intelligent Network Contol Point," ISS Symposium, pp. 41–43 (Apr. 23, 1995).

Swale, R.P., et al., "Convergence of Public and Private IN," *BT Laboratories*, pp. 216–221 (Mar. 1992).

Swale, R.P., et al., "Virtual Networks of the Future— Converging Public and Private IN," *The Institution of Electrical Engineers*, pp. 6/1–6/5 (Oct. 1993).

Swale, R.P., et al., "Distributed Intelligence and Data in Public and Private Networks," *BT Technology Journal*, vol. 13, No. 2, pp. 94–104 (Apr. 1995).

Tao, J., et al., "Internet Access via Baseband and Broadband ISDN Gateways," *IEEE*, pp. 485–490 (1994).

Yang, Che Liang, et al., "The Design and Implementation of a Service Logic Execution Environment Platform," *IEEE*, pp. 1911–1917 (Nov. 1993).

\* cited by examiner

TELECOMMUNICATIONS SYSTEM AND METHOD PROVIDING GENERIC NETWORK ACCESS SERVICE

TECHNICAL FILED OF THE INVENTION

The invention relates to telecommunications and more particularly to a system and method for accessing different network access servers through a telecommunications system comprising a bearer network, service switching points and a service control subsystem. The network access servers may provide access to one or more intranet/extranet/internet networks and may be under the control of the same or different service providers, generically referred to below as "access service providers" (ASPs). An access service provider ASP may provide services additional to simple network access such as chat rooms, bulletin boards etc; in the present specification the term "ISP" is used to mean an access service provider providing internet access, whether or not additional services are also provided.

BACKGROUND ART

The explosive growth of the internet has lead to some arduous coexistence between two different worlds and services: a traditional world of telecommunication services coexisting with a new emergent world of information services.

The world of telecommunication services is that of the telecommunications operators, such as those running the traditional Public Switched Telephone Networks (PSTN) and the more recent Public Land Mobile Networks (PLMN). The last decade or so has seen important developments in traditional PSTNs including the introduction of the fully digital networks (particularly Integrated Service Data Network—ISDN) and the emergence of new services and intelligence in the telecommunications. Examples of such services are the 800 number and call forwarding. The architecture of a modern PSTN is depicted in FIG. 1. Customer Premise equipments (CPE) 10 such as standard telephones or more recently ISDN terminals are connected to the network by dedicated transmission links, typically to a Local Exchange. An Exchange is often referred to as a Switching Point or SP. Each local SP is connected to a trunk Exchange that is also connected to other exchanges or SPs so as to form an inter-exchange network.

Generally speaking, the control function of the PSTN uses now a separate Common Channel Signalling network (CCS) based on the CCITT No 7 protocol suite. In FIG. 1, the signalling network is represented by reference number 16. When the Customer Premise Equipment CPE is a dumb telephone, the signalling at the access network may still be in-band signalling while in the case of a modern ISDN terminal, even at the level of the access network the signalling is conveyed through a path (D-channel) that is separate from the voice path constituted by the B-channels.

More recently, more intelligence has been introduced in the control or signalling function of the PSTN, and some SPs were replaced by more powerful and sophisticated Service Switching Points (SSP) 12 allowing new Intelligent Network (IN) Services. With respect to FIG. 1 again, a SSP 12 is arranged to suspend call processing at defined points-in-call upon particular criteria being met, and to generally delegate the continuation of the processing of the call to a Service Control Point (SCP) 13, generally remote, which forms a part of a Service Control Subsystem 15.

More particularly, when the SSP 12 receives a call, it examines trigger conditions as well as user information to ascertain whether the call requires a service to be provided in addition to the normal routing function. If a service is to be provided, the considered SSP messages the SCP 13 a request for that service. The Service Control Point may be associated with a Service Data Function (SDF) 14 permitting the use of subscriber information.

Typical examples of such higher level services are the above mentioned call forwarding services or still the 800 number services. The PSTN may be further enhanced by the use of Intelligent Peripherals (IP) which provides additional communication with the end-user, by means of voice announcements for instance. Service control functionality and IP functionality may also be combined in Service Nodes.

The above-described model for the provision of IN services in a PSTN can also be mapped onto PLMNs (Public Land Mobile Networks) such as GSM and other mobile networks. Control signalling in the case of a mobile subscriber is more complex because in addition to all the usual signalling requirements, there is also a need to establish where a call to a mobile subscriber should be routed; however, this is not a very different problem from a number of called-party IN services in the PSTN. Thus in GSM, the service data function (SDF) is largely located in a system named a Home Location Register (HLR) and the service control function in a system named a Visitor Location Register (VLR) that is generally associated on a one-to-one basis with each SSP (which in GSM terminology is called a Mobile Switching Centre, MSC).

Because subscribers are mobile, the subscriber profile is transported from the HLR to whichever VLR happens to be functionally closest to be mobile subscriber, and from there the VLR operates the (fixed) service using the subscriber profile and interacts with the SSP. The HLR and VLR thus constitute a service control subsystem similar to an SCP or Adjunct with their associated databases.

It is, of course, also possible to provide IN services in private telephone systems and, in this case, the service control function and service data function are generally either integrated into a PABX (Private Automatic Branch Exchange) or provided by a local computer. The service control subsystem, whilst present, may thus not be a physically distinct from the PABX.

In the following, the terms 'bearer network', 'service switching points' and 'service control subsystem' will be used to refer not only to the respective elements of a PTSN but also unless the context demands otherwise to refer to the equivalent elements in a PLMN and other types of telephone networks.

U.S. Pat. No. 5,452,350 assigned to Advantis describes one example of an IN service, in this case relating to the routing of calls to a call center or similar resources. More particularly, the SCF of a PSTN queries a routing processor of the subscriber (e. g. call center) network to be told the number to which a call should be routed to access a particular resource (any PSTN termination, including ACD, IVR, modems and individual stations). The routing processor effects routing control in dependence on the identity of the caller (doing a lookup in a customer database) and "capacity percentages" representing a proportion of all calls for a desired resource that can be handled as indicated by feedback from the resource.

EP-A-0 654 930 (AT&T) entitled "Network-accessible Intelligent Telephone Service" describes another example of an IN service, in this case for providing a user with a common way of accessing a variety of services from different telephone networks. More particularly, a central database is provided for holding user-related data (including service profile data for a number of services), this database being accessible (via SS7 links) from any of a plurality of telephone networks. When needed, service details are passed to regional processing nodes which then deliver services as required in the language specified. The service details delivered to such nodes may include the name and numbers of the user's top called-numbers list which are then announced to the user to enable the latter to select a desired number to be called.

Although the architecture of the recent telecommunication networks have reached a high degree of sophistication, as shown in FIG. 1 and from the preceding example, the possibilities opened up by interaction with the new—and explosive—world of Information services are still being explored. The information services world covers all the electronic information distribution services that are made possible by the recent development and success of the Internet-based global applications, the best example of which being certainly the World Wide Web (WWW). In the perspective of Internet, anyone may become an information provider with a world-wide audience.

The mutual development of these two worlds of information and telecommunication services requires a higher and closer interaction between these in spite of their strong differences in culture. Some simple and very basic interactions have already been widely implemented. For instance, what is called a network access is the connection that one may have to the Internet network; since most users of the World Wide Web do not have direct network access to the Internet, they must access the network via an Internet Service Provider (ISP) that does have such a direct network access. In this case, the user generally communicates with the ISP over the PSTN using a modem and employing an appropriate protocol which allows the Internet packets to traverse the ordinary telephone lines. This example illustrates a very simple co-operation between the Internet world of information services and the telecommunication world: namely the setting up of a bearer channel over the PSTN for subsequently generated Internet traffic.

In a similar manner, enterprise users can use the public telephone infrastructure to access the enterprise computer network ("intranet"), generally through one or two levels of security.

The equipment used to enable access to an intranet, internet, or similar network via a telephone network is referred to herein as an access server or point of presence (POP).

Other techniques for increasing the interaction between the world of the communication services and that of the information services are described in Applicants published International Applications No:

PCT/GB96/03048 "Method of providing telecommunication services"

PCT/EP98/01119 "Service Node for Providing Telecommunications Services"

PCT/GB97/00469 "Method of making available content resources to users of a telephone network"

These applications show methods for retrieving service control data and logic over the internet for use in service provision, as well as methods for retrieving content over the internet for playback to telephone users.

The co-operation between the techniques carried out in the information services world and the telecommunications world needs to be improved. There is a strong desire for a higher degree of interaction between the worlds and techniques of Internet and telecommunications.

Consider for instance the situation of an user who wishes to get access to different networks or to different internet service providers' for the different services they provide. With respect to FIG. 1 again, he may wish first to access public Internet network 30 through a selected ISP, and then to access an extranet network 40 of another ISP, and finally a private intranet network 20 which may be that of the company or the firm of which he is an employee.

With the techniques known in the art, the user is compelled to handle different and independent access procedures when he wants to have access rights to the different network access servers 45 involved in the foregoing example.

For each access, the user will have to dial into the public telephone network in order to call up his selected access service provider ASP, and consequently manage multiple telephone numbers and log-in procedures. Today customers typically subscribe independently to different ISPs. Those ISPs typically provide local phone numbers to ensure cheap network connections for the user. For mobile users, who need to connect from different geographical locations, this requires that the user has an up-to-date list of the ISPs' local phone numbers. In response to this problem, telephone network operators now provide virtual local phone numbers, where calls to the numbers are charged at a local rate, even if called from a remote (ie non-local) area. However, the user is still required to know the virtual local phone number corresponding to each ISP to which he/she wishes to connect.

Additionally, as well as paying a connection fee to the telephone network operator, the user must maintain an account with each ISP. Each ISP will implement its own accounting scheme, typically based on a monthly or yearly subscription rate. Most ISPs have avoided imposing a per-usage billing scheme (such as exists in telephone networks) scheme because of the high cost involved in managing and maintaining such a billing scheme.

Finally, as employees become more mobile, and as telecommuting becomes more popular, companies often wish to arrange common access arrangements for all of their staff. An ISP may be interested in offering preferential tariff rates or enhanced quality of service guarantees to all employees of a company. This is particularly advantageous for companies where employees often work from outside the office, and need cheap and efficient communication links with the office. With such arrangements, it is important that the conditions of the arrangement (such as the tariff rates or the quality of service guarantees) can be enhanced or modified quickly, if necessary, and that such modifications can be applied simultaneously to all employees of the company. Furthermore, a company may have more that one agreement with an ISP, allowing additional access rights or QoS guarantees to certain employees.

SUMMARY OF THE INVENTION

It is an object of the present invention to enhance the ability of the service control subsystem of the telecommunications system to provide value-added services to users accessing network access servers, for example an ISP internet access server.

This and other problems are solved by the methods and apparatus which are defined in the accompanying claims.

Thus, in a preferred embodiment of the invention applied to a telephone system, a database holds data about different dial-up access services, for intranet/extranet/internet access, to which a user may have some access rights, as well as the different access parameters; this database is either part of the service control subsystem of the telephone system or is accessible to it. The telephone system provides a single telephone number—known as the generic access number to activate a generic dialup access service. When a user calls the generic access number, the local SSP (or MSC) sends a request to the service control subsystem. The latter initiates an authentication procedure with the user, and once the user has been identified, the service control subsystem can retrieve the particular user's profile from the database. This profile will include data about the access services for which the user has access rights. This data may directly identify the access service providers or may simply give the telephone numbers of the access servers to which the user subscribes. The data may include other access parameters (such as tariff rates and Quality of Service guarantees). The available access services can be presented to the user, and in accordance with the user's choice and the corresponding information stored in the database, the service control subsystem can instruct the local SSP(or MSC) to connect the user to an appropriate access server. The choice of access server may be effected in whole or in part in dependence on external factors (such as time-of-day, access server availability, etc. ) not dictated by the user. When the connection is terminated, the service control subsystem is informed, allowing it to generate the appropriate accounting and billing data.

Thus, in at least a preferred embodiment, the invention provides a user with a single authentication, authorization and accounting point to access different internet and intranet networks, where that entry point is associated with a globally unique phone number.

Preferably, all the users belonging to a group or a company are commonly identified and group-wide criteria applied to access server selection or quality of service choice. This facilitates access service management for the group and may be extended to include the generation of a single bill for all such accesses from group members.

DESCRIPTION OF THE PREFERRED
EMBODIMENTS OF THE INVENTION

Figure 1:
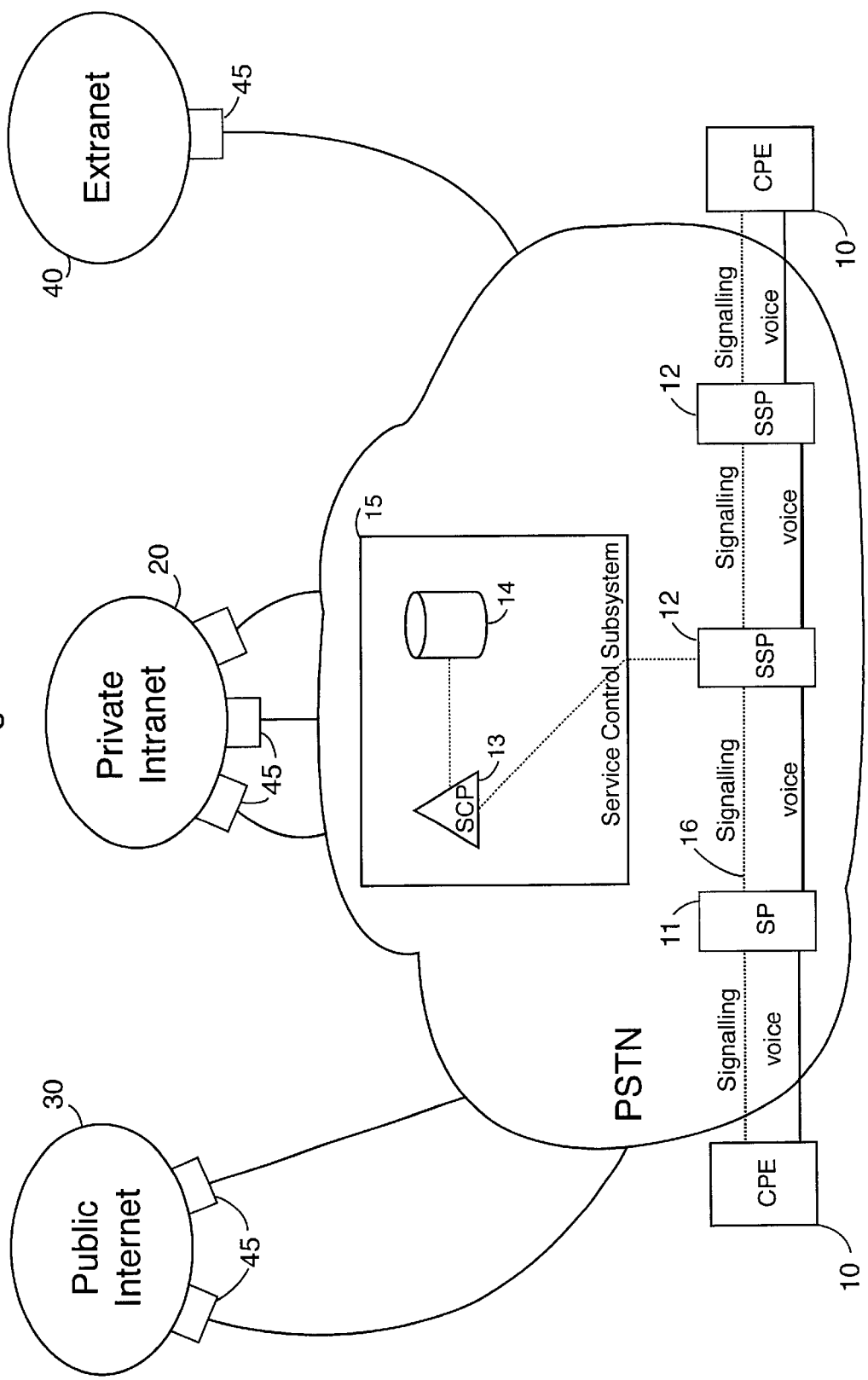
FIG. 1 illustrates the interaction of a Public Switched Telephone Network (PSTN) with different intranet/extranet/ internet networks.
Figure 2:
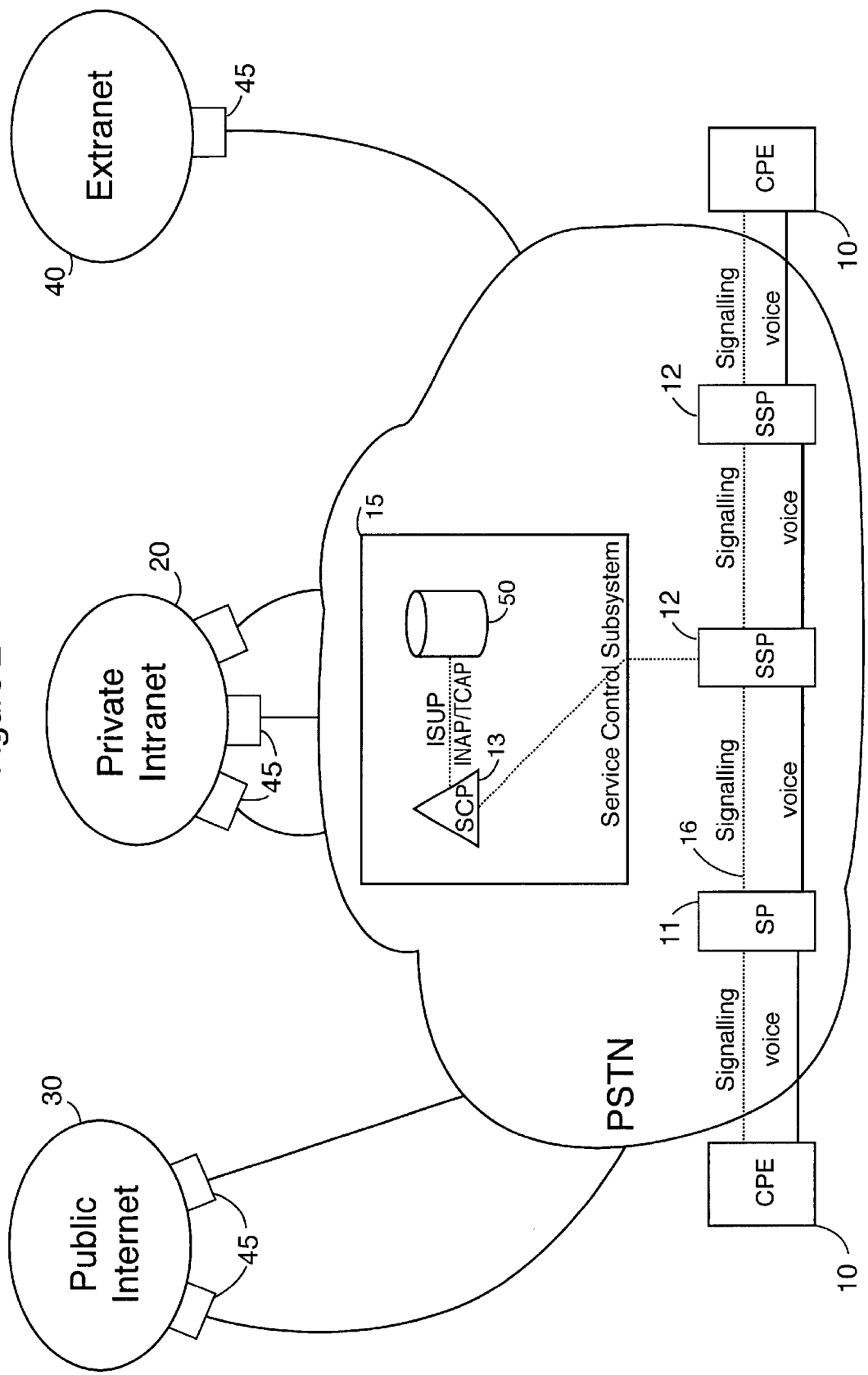
FIG. 2 illustrates the structure of one embodiment of the invention.

FIG. 2 illustrates the principle of the present invention with reference to a particular embodiment that allows an enhanced co-operation between the intranet/extranet/ internet networks and the PSTN. Basically the PSTN uses an expanded database 50 for storing the information relating to all the different subscriptions that one user may have. More particularly, for each user, the database will hold a list of access service providers subscribed to by the user and the associated access parameters including the number of the related access servers. Access parameters may also include Personal Identification Number (PIN) and Quality of Service attributes etc. The Quality of Service attribute is designed to ensure that the considered customer gets network access via an appropriately rated access server.

The SCP 13 in the PSTN responds to a service request from the SSP 12 to from specific service logic programs on particular data according to the information contained in the service request, and to send back to the requesting SSP appropriate instruction. In the FIG. 2 arrangement, the SCP 13 is capable of identifying a particular customer. This can be achieved in different ways, for instance by means of a personal calling card which can be read by a card reader at the user telephone and verified by the PSTN. Alternatively the PSTN operators can provide a free phone number requiring the user to enter a PIN identification number before accessing the Internet and intranet network. Any other suitable means could also be used.

Once the SCP 13 in PSTN 1 has identified the particular customer, the method involves an access to database 50 to retrieve the customer profile corresponding to that person. That profile includes the list of access service providers to which this person has subscribed and their associated Access parameters.

The embodiment of the invention uses the Intelligent Network Architecture where PSTN switches access SCP 13 and its associated database 50 using the INAP protocol, the SS7 network to transport the INAP messages to/from SCP 13.

As will be described in more detail, this is achieved as follows:

- On detection of the generic access number, the SSP initiates a dialog with SCP 13 by means of a TCAP message. This message will include, as parameters, means to identify either the calling party or the called number (or both).
- Once the calling party has been identified, the application (service logic program running on SCP 13) handling the service request represented by the TCAP message will extract from the database 50 the subscription information corresponding to the calling party.
- A further exchange of TCAP messages can be optionally used between SCP 13 and the SSP to present service choices to the caller. In this case, an Intelligent Peripheral (IP) such as an interactive voice server will present the service choices to the calling party, to let him/her choose one of the service options.
- An appropriate TCAP message is used for transporting the user's choice back to the application.
- In response to the user choice and the parameters stored in the database 50 the SCP 13 can instruct the switch to direct the call to the appropriate access server 45 by means of an appropriate TCAP message.

Upon the call arriving at the chosen network access server, dialup network access is provided without requiring the user to input further authentication information.

The PSTN can also generate the corresponding billing records.

Hereinafter will be described an implementation of the foregoing embodiment of the invention with particular reference to the different INAP messages and procedures that are used for selecting and connecting to an appropriate network access server for the desired network service. The implementation takes advantage of the INAP messages that are defined in the recommendations provided in ETSI Intelligent Network Capability Set 1 (CS 1), Core Intelligent Network Application Protocol (INAP), as amended by European Telecommunication Standard Institute (ETSI).

Let us consider one customer who has modem access to a PSTN and access rights to multiple Internet services providers. These different accesses may have been arranged by a third party which will typically also be the billing entity. According to the current embodiment, the customer is provided with a single phone number from that third party, and this phone number is to be used for initiating the generic access process. The dialled digits entered by the user trigger the local switch to send a request to the SCP 13. This is achieved by means of 'Initial_DP' (Initial Detection Point) message that is sent from the switch 12 to the SCP 13 with the particular 'CalledParlyNumber' parameter containing the dialled digits. This message constitutes a service request and results in the instantiation of a corresponding service logic program on the SCP for handling the request. The application first initiates a user identification or authentication procedure to verify the identity of the calling party. Different procedures may be used. In one embodiment, the SCP issues a ConnectToResource message to the switch requesting that the calling user be connected to an Intelligent Peripheral (IP). A further 'PromptAndCollectUserInformation' message is sent to the switch in accordance with the Core INAP protocol to collect the user's subscriber number and the PIN code. The information collected is returned back to the SCP in a TCAP result message where a lookup is done in database 50 to check the subscriber number and PIN code against a list of valid pairings. Alternatively, the user authentication may use a procedure based on a calling card. In this case, the calling party is identified by the calling card used, and the billing charge for the connection will be charged to that calling card. In this case, the calling card number will be retrieved using specific calling card reading equipment, although the calling party may still be requested to enter a PIN number.

Once the SCP has authenticated the calling user, the User Access options (user profile) that is contained in the centralised database 50 is retrieved by the application. Within the user profile there is a list of the possible access service providers available to the user concerned, with the associated access rights and quality of service parameters for each provider. In one preferred embodiment of the invention, each access option is also associated with a particular tariff rate which will be actually applied if the connection is established.

The different options that are available are then presented to the user. This is achieved by means of the 'PromptAndCollectUserInformation' message sent by the application to the switch. This message causes the switch to instruct an Intelligent Peripheral (IP) to present the user with the different access options which the customer may choose. The user chooses which option he/she wants and the choice of the user is returned back to the application by means of a TCAP result message. The application running on the SCP will map the user's choice onto a real phone number corresponding to a network access server of a particular access service provider. network. The application will instruct the switch to disconnect the calling user from the Intelligent Peripheral, using a DisconnectForwardConnection message, and will then instruct the switch to connect the user to the identified network access server by means of a 'Connect' message.

From that instant, the switch can establish a connection from the calling user to the access server defined by the number received from the application. The establishment of the connection complies with the ISDN User Part (ISUP) protocol known to the skilled man and need not be described in detail here.

It should be noted that the above messages sequence may also be used for other applications such as credit card calls, or for calls which are billed using a calling card. Indeed in those particular case, it is also required to collect the information that is contained in the card prior to the establishment of the call.

As mentioned above, the database can also store the tariff rates applicable to the different access options. At the end of the connection the corresponding billing records are generated. This can be achieved at the end of the call by the application running on the SCP; more particularly, when the connection is terminated, the switch transmits an 'EventReportBSCM' message to the application in order to inform the latter that the call has terminated. On receipt of this message the application can generate the correct billing record. Alternatively, when the connection is being established, the application can send the applicable tariff rate to the switch via a 'SendChargingInformation' message so that the latter can use the correct rate when generating the billing record at the end of the call.

Hereinafter is described an implementation of the FIG. 2 embodiment that is particularly suited for the USA. In the United States, equivalent functionality to that provided by the above-referenced European standards is provided by the Advanced Intelligent Network (AIN) protocol suite. Further, in the USA the number dialled by a calling user will typically direct the call to an Inter exchange Carrier (IXC) and the SCP will reside in the IXCs network. The particular switch in the IXC network that receives the dialled digits will issue a 'InfoCollected' message that is sent to the centralised database with the 'CallingPartyNumber' parameter containing the dialled digits. Similarly as above, an authentication procedure is initiated between an Intelligent Peripheral and the calling party to verify the identify of the calling party.

After the authentication procedure, the profile of the user is retrieved from the database and the preceding mechanism is used again to present the corresponding set of options to the user. With the user's reply, the application running on the SCP will, as already described above, map the user's choice onto a real phone number corresponding to a network access server of a particular access service provider. This number is sent to the switch through the SS7 network by means of a 'ForwardCall' message defined in the Advanced Intelligent Network (AIN) standard. The switch can then establish a connection from the calling user to the access server.

It should be noted that the particular structure of the database which is used may take different forms which can vary in accordance with the particular database technology employed. Any suitable database may be used that is capable of storing string of integers for the phone numbers as well as if necessary integers for the tariff rates and quality of services parameters.

It will be appreciated that a communication link can be provided between the PSTN network and an ASP's network access equipment to allow the service control subsystem of the PSTN to exchange user profile data and access server data with database systems owned by the ISP, to ensure that up-to-date data is available to the service control subsystem when processing a user's network access request.

Alternatively, the users could be provided with the facility to update their user profiles themselves, for instance via the WWW using a suitably-designed form structure.

Figure 3:
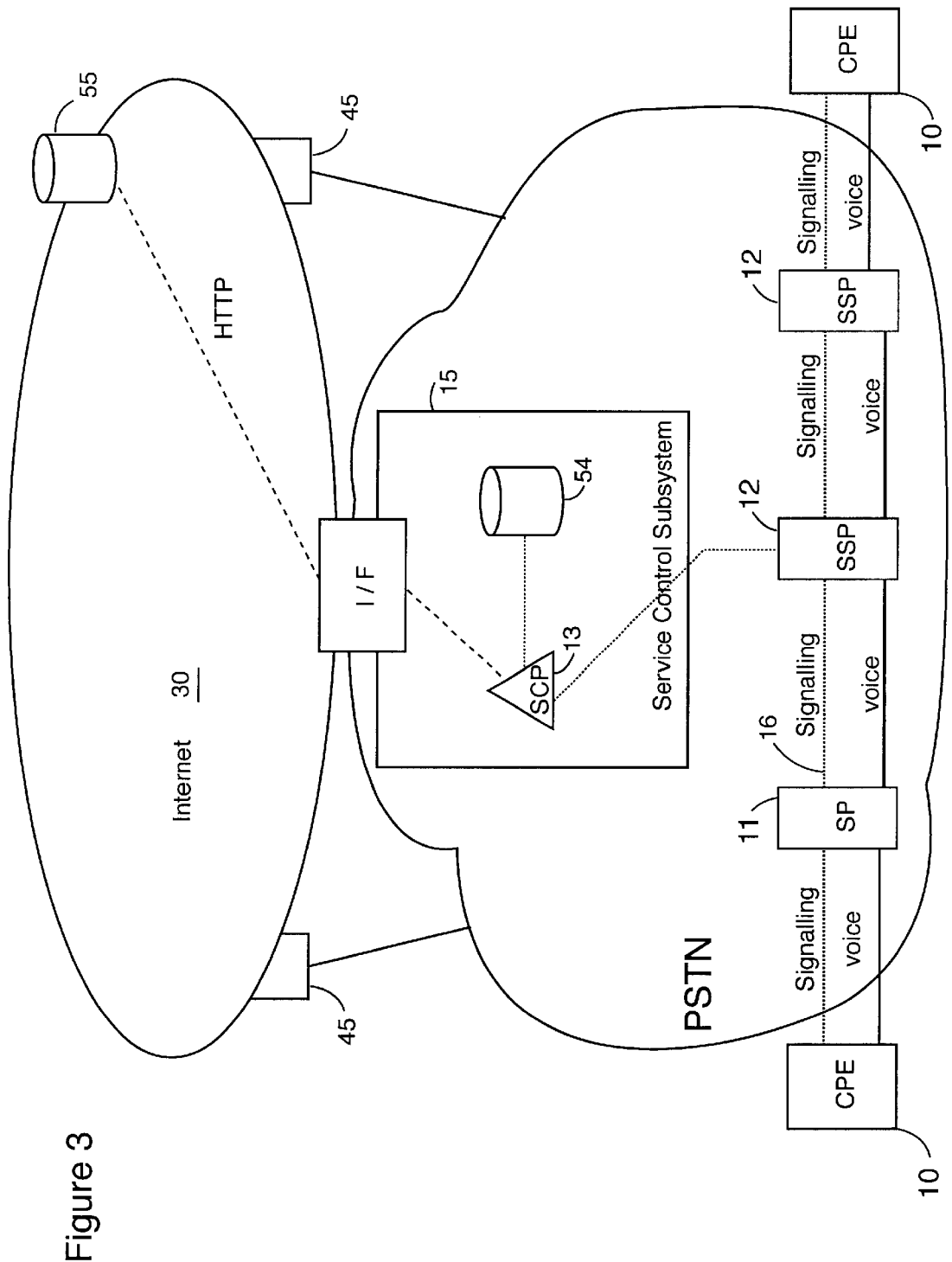
FIG. 3 illustrates the structure of a second embodiment of the invention.

FIG. 3 shows a second embodiment of the invention in which the user profile data giving details of the user's access rights, is held on a database server 55 accessible from the SCP over the public Internet 30 using, for example, the HTTP protocol (or any other suitable protocol such as FTP); the user profiles may be located at respective URLs or in a standard database held (or accessible) by the server. With this general arrangement, the SCP first carries out user authentication—for example, by reference to information held in its local database 54—and then retrieves the user profile data over the internet 30 for use in querying the user as to the desired service and subsequent connection of the user to the appropriate network access server. The necessary address details of the server 55 could be stored in database 54 for each authorised user or obtained from user input; appropriate techniques are described in Applicants above-mentioned International Applications. The PSTN operator is preferably still responsible for billing both for use of the PSTN and the network accesses made by a user.

The server 55 is, for example, an enterprise server under the control of a particular enterprise and holding user profile data on the access rights of its employees to various network access servers (intranet/extranet/internet); in this way it is easy for an enterprise to control the access rights of its employees and ensure that they use the ASPs in the most efficient way for the enterprise, particularly in terms of cost. Different access rights (including different QOS) could be granted to different types of employees.

By placing the user profile data on a server accessible over the internet 30, the data becomes accessible from any telephone network. However, to take full advantage of the possibilities thereby presented, it is preferable that no user specific information is required to be held locally in database 54. This means that authentication should either not involve network stored information or that the latter is held on server 55 along with the user profile data. Furthermore, the address of the server 55 must be either user input or implicit (for example, the generic access service is accessed through a number that implicitly identifies the server 55). As regards billing, the details of the network accesses and PSTN usages can be transferred for billing to the user home telephone network or can be directly charged to a credit card if the appropriate credit card authentication procedures have been satisfactorily executed as part of the initial access process.

Instead of the server 55 being controlled by an enterprise, it could be controlled by the operator of the user's home network (that is, each telephone operator offering this service would have its server 55 through which the user profile details were accessible to SCPs around the world, with suitable security measures). The server 55 could alternatively be controlled by an access broker who contracted with ASPs for particular access services, with users for access to those services, and with telephone network operators for making the generic access service available to the broker's subscribers.

Although the server 55 has been shown as accessible over the public internet, it could be accessible over a restricted network including a dedicated line from the PSTN to the server 55.

Variants

In the foregoing description, reference has been made to the user wanting network access via a particular ASP with a subsequent direct mapping onto the number of a corresponding network access server. In more general terms, however, the user is primarily concerned with getting a particular access service. The desired access service may be so specific, or the services subscribed to so limited, that there can only be one mapping to a suitable access server (for example, a user may want to access a particular intranet served by only one access server); this has assumed to be the case in the foregoing description. In other cases, however, the desired access service may be defined in sufficiently general terms as to permit several possible solutions in terms of access servers, not necessarily all controlled by the same ASP. Thus, a user may want public internet access at a particular quality and this may be available from more than one ASP to which the user subscribes—in this event, after the initial selection by the user of the desired service (in this case, network, QoS), further selection needs to be carried out. This further selection can be done by querying the user or by recourse by the SCP to further information in the form of predetermined data held with the user profile (for example, rules specifying preferences between ASPs, or invoking the lowest tariff available), and/or dynamic information concerning resource availability (in particular, access service availability) obtained from the PSTN or from a targeted ASP. Thus, by way of example, a user might have requested internet access at a particular QoS and this request may be satisfiable (according to the user profile data held in database 50/55 ) by two ASPs subscribed to by the user; in order to select which ASP to use, the SCP now applies a lowest-tariff rule (this rule may be a default rule rather than one specifically stored in the user profile and the relevant tariff data could be accessed from remote data sources associated with the ASPs concerned); after selection of the ASP, the SCP may dynamically query the ASP over a data/signalling network as to the availability of internet access servers at the specified QoS with the ASP returning the number of the actual network access server to be used. It should be noted that in this case, the numbers of the access servers need not be stored in the user profile for those ASPs where the access server number is to be provided dynamically by the ASP as needed (thus, a flag may be associated with each access service listed in the user profile indicating whether the access server number is to be obtained from the ASP as needed or whether it is held in the user profile).

The ASPs can be more closely involved in the authentication process. For example, upon a particular ASP being selected, the SCP could contact an authentication server of the ASP to confirm—on the basis of the information known to the SCP—that the ASP remains willing to provide the access service to that user. The user profile may include ASP specific user identification data which the SCP passes to the authentication server of the ASP; preferably, the user should not be required to enter ASP-specific authentication data as this detracts from the merits of having a generic access service. Authentication servers for inter-ASP authentication of users (see for example, RFC 2194 September 1997) are known in the art and will not be described herein.

When the SCP routes a dialup access call to the network access server of an ASP, the latter needs to know that the incoming call is of this type so that the ASP preferably does not repeat the authentication dialog with the user or directly bill the user where this is being done by the PSTN operator (or other party). The simplest way of the ASP knowing that the call is of this type is by having specific numbers for such calls—however, additional information will generally need to be passed to the ASP to give it confidence that the authentication and billing have been taken care of by a trusted partner. This can be done by including appropriate identifiers in the signalling information associated with call set up to the network access server. For example, if Q931 signalling is used to communicate from the PSTN to the network access server, then the SCP could cause an appropriate identifier to be included in one or more "facility information elements" of a Q931 message. The same mechanism could be used to pass to the network access server any required setup data held in the user profile for that access service (such as QoS data for the service subscribed to by the user).

Even if the ASP is not responsible for authentication and billing, it will probably wish to track access details and will therefore want to identify the user through information passed to it through the PSTN signalling channel. The ASP may carry out its own authentication based on this information or may content itself with recording the user id and call details for reconciliation with the billing data fedback to it by the PSTN billing system.

Although from a user's standpoint it is preferable for billing of the telephone charges and network access charges to be made by one billing authority such as the user's home PSTN operator, for practical reasons it may be simpler only to unify billing of network accesses made through different ASPs and to have the telephone charges handled separately. Thus, the SCP could pass network access details (for example, user id, ASP, network access server, QoS, duration of access, time of day) to an access broker running a server 55. Even if the PSTN remains responsible for billing, where the server 55 is run by an enterprise, that enterprise could be provided with access usage details of its employees by the PSTN in real-time—that is, upon an access call being terminated, a message would be sent to the server 55 recording the access details including user id, duration, access service used.

As described above, the generic access service is accessed using a particular telephone number associated with this service. Alternatively, the generic access service could, for example, be one option on a menu of services available to a group of users at a specific number.

The interaction between the user and the PSTN for authentication and access service selection will generally involve connection to an IP where voice messages are directed to the user and voice/DTMF feedback is collected. Thereafter the call is routed to the selected access server and information exchange is thereafter through modems at the user terminal and at the access server. It will be appreciated that modem operation will need to be initiated at an appropriate point in the transfer to the access server. This can be handled by user intervention or automatically by suitable software in the user's computer (or other equipment being used for dialup access) on detecting modem signals from the access server. Alternatively, the user's computer could interact with the IP through a modem link, the IP being itself provided with a modem for effecting data exchange with the user computer, such as presenting the list of available access services on the user's computer.

What is claimed is:

1. In a telecommunications system comprising a bearer network with at least one switch operative to detect when a service is to be provided to a call routed to it, and a service control subsystem for controlling service provision to the call, a method of accessing different network access services through the telecommunications system, said method involving executing a generic access service under the control of the service control subsystem to route a call placed by a user, to a network access server selected to provide a desired network access service to the user, the generic access service utilising stored user profile data indicative, for a given user, of the network access services available to that user; the generic access service involving the steps of:

(a)—initiating a user-identification procedure for identifying the calling user;
    (b) accessing the stored user profile data corresponding to the identified user to determine the network access services available to that user,
    (c) if more than one service is available to the user, selecting a particular network access service from those available to that user;
    (d) using information held in the user profile data about the selected network access service, to derive the number of a network access server for providing the selected network access service; and
    (e) directing the call to this number.

2. A method according to claim 1, wherein said user-identification procedure involves user authentication through means of a user-held token or password.

3. A method according to claim 1, wherein the user profile data is held in a database forming part of the service control subsystem.

4. A method according to claim 3, wherein said database is remotely updateable by users using the HTTP protocol.

5. A method according to claim 1, wherein the user profile data is held on a server accessible over the Internet from the service control subsystem.

6. A method according to claim 1, wherein the user-authentication procedure of step (a) is the sole authentication measure involving the active participation of the user needed for access by the user to the network access services available to that user through the generic access service.

7. A method according to claim 1, wherein following selection of a particular network access service in step (c), an authentication exchange is effected over a signalling/data network between the service control subsystem and the provider of that access service using data held by the service control subsystem, step (e) only being effected if this authentication exchange is completed to the satisfaction of the service provider.

8. A method according to claim 1, wherein following selection of a particular network access service in step (c), an authentication exchange is effected over a signalling/data network between the service control subsystem and a third-party access service using data held by the service control subsystem, step (e) only being effected if this authentication exchange is completed to the satisfaction of the service provider.

9. A method according to claim 1, wherein upon the call being directed to a particular network access service, user identification information and an indication that the call has been subject to the generic access service, are also passed to the network access server over a signalling network.

10. A method according to claim 1, wherein step (c) involves user interaction.

11. A method according to claim 1, wherein step (c) involves application of at least one selection rule stored in association with the user profile data of the user concerned.

12. A method according to claim 11, wherein said at least one rule is applicable to multiple users and is stored separately from the individual user profiles though associated therewith.

13. A method according to claim 1, wherein step (d) is effected by lookup in the user profile data of the number of the network access server corresponding to the selected network access service.

14. A method according to claim 1, wherein step (d) is effected in dependence on the availability status of network access servers capable of providing the selected network access service, this status being transmitted to the service control subsystem by the provider of the selected access service.

15. A method according to claim 1, further involving generating for each successful call through the generic access service to a network access server, call data indicative at least of the identity of the user, the network access service used, and the duration of such usage.

16. A method according to claim 15, further involving providing the call data to a third party over a data network.

17. A method according to claim 15, further involving generating a billing record for the call according to tariff information for the selected network access service.

18. A method of providing dialup network access services to users of a telephone system, in which the operator of the telephone system implements the method of claim 17 and periodically bills said users for use of the telephone system and for the network access services accessed through the generic access service, the operator billing the network access services for the providers of those services.

19. A method of providing dialup network access services to users of multiple telephone systems in which each said telephone system implements the method of claim 16 and said user profile data is stored on a server, under the responsibility of said third party, for access over a data network from the service control subsystems of the telephone systems, said third party billing users for the network access services accessed through said generic access service.

20. A method according to claim 1, wherein the telecommunications s is a PSTN and said at least one switch is a Service Switching Point operative to detect calls made with a specific user-input number corresponding to the generic access service and to cause the service control subsystem to initiate the execution of that service for each such call.

21. A method according to claim 1, wherein the telecommunications system is a PLMN and said at least one switch is a Mobile Switching Center operative to detect calls made with a specific user-input number corresponding to the generic access service and to cause the service control subsystem to initiate the execution of that service for each such call.

22. A telecommunications system comprising a bearer network with at least one switch operative to detect when a service is to be provided to a call routed to it, and a service control subsystem for controlling service provision to the call, said system being connected to at least one Intranet/extranet/intranet through network access servers whereby different network access services can be made available to a user of the telecommunications system, the service control subsystem including means for executing a generic network access service in respect of a call, these means comprising:

means for initiating a user-identification procedure for identifying the calling user;

means for accessing a database holding user profile data indicative, for the identified user, of the network access services available to that user, means for selecting a particular access service from those available to the identified user;

means using information held in the user profile data about the selected access service, to derive the number of a network access server for providing the selected access service; and means for directing said switch to route the call to this number.

23. A method of providing a user with access to network access services, the method comprising:

connecting the user to an entry point, wherein the user dials a globally unique phone number to initiate a user identification procedure for identifying the calling user, the entry point being associated with the globally unique phone number;

accessing stored user profile data corresponding to the identified user to determine the network access services available to that user;

selecting a particular network access service from those available to that user;

using information held in the user profile data about the selected network access service, to derive the number of a network access server for providing the selected network access service; and directing the call to this number.

24. The method according to claim 23, wherein the user can select a plurality of internet and intranet network service providers by dialing the globally unique phone number.

25. The method according to claim 23, wherein the user dials the globally unique phone number from a computer.

26. The method according to claim 23, wherein the user can have access to the network access services provided by a plurality of network service providers without having to separately subscribe to these network service providers.

27. The method according to claim 23, wherein the user has access to a plurality of internet service providers without having to separately subscribe to these internet service providers.

28. A method according to claim 1, wherein the number of the network access server is a phone number which, by dialing such phone number from a computer, the user will be connected to the Internet.

29. A method according to claim 1, wherein the number of the network access server is a phone number which, by dialing such phone number from a computer, the user will be connected to an Intranet.

30. A method of providing a user with access to a data network through a telephone network in response to the user dialing a specific telephone number associated with a generic access service, executing in the telephone network service logic to route a call placed by a user to a network access server through which the user can access the data network using a network access service, wherein a service logic carries out the steps of:

initiating a user identification procedure for identifying the user;

accessing stored user profile data corresponding to the identified user to determine the network access service from different network access services available to the user;

using information held in the user profile data about the network access service to derive a number of the network access server; and directing the call to the number.

31. A method according to claim 30, wherein the user identification procedure involves user authentication through a user-held token or password.

32. A method according to claim 31, wherein the user identification procedure is the sole authentication measure involving active participation of the user needed for access by the user to the network access services available to the user through the generic access service.

33. A method according to claim 30, wherein following determination of the network access service, an authentication exchange is effected over a signalling data network with a service provider of the network access service, the call only being directed to the network access server if the authentication exchange is completed to the satisfaction of the service provider.

34. A method according to claim 30, wherein upon the call being directed to a particular network access service, user identification information and an indication that the call has been subject to the generic access service are also passed to the network access server over a signalling network.

35. A method according to claim 30, wherein determination of the network access service involves user interaction.

36. A method according to claim 30, wherein determination of the network access service involves application of at least one selection rule stored in association with the user profile data of the user.

37. A method according to claim 36, wherein the selection rule is applicable to multiple users and is stored separately from the user profile data.

38. A method according to claim 30, further comprising the step of for each successful call through the generic access service to the network access server, generating call data indicative at least of the identity of the user, the network access service used, and the duration of such usage.

39. A method according to claim 38, further comprising the step of providing the call data to a third party over a data network.

40. A method according to claim 38, further comprising the step of generating a billing record for the call according to tariff information for the selected network access service.

41. A method according to claim 40, further comprising the step of periodically billing the user for use of the telephone network and for the network access services accessed through the generic access service, wherein an operator bills the network access services.

42. A method according to claim 39, further comprising the step of storing the user profile data on a server supervised by the third party, for access over a data network from service control subsystems; and billing the user by the third party.

43. In a communications system including a bearer network having at least one switch for the transport of telephone calls bearing data and operative to detect when a service is to be provided to a call routed to it initiated by a user and a service control subsystem for controlling service provision to the call for the user, a method of accessing different network data servers so as to connect the user to a selected one of a plurality of different data network access providers for accessing different data networks, each different data network access provider being associated with a different telephone number, the method comprising:

(a) initiating a user-identification procedure for identifying the calling user;

(b) accessing the stored user profile data corresponding to the identified user to determine the network access servers available to that user;

(c) if more than one server is available to the user, selecting a particular network access server from those available to that user;

(d) using information held in the user profile data about the selected network access server, to determine the telephone number of the network access server; and (e) directing the call to the telephone number determined in step (d).

* * * * *